May 4, 1937.  F. D. AUSTIN  2,078,990
SAFETY DEVICE FOR HEAT TRANSFERENCE APPARATUS
Filed Aug. 27, 1932  2 Sheets-Sheet 1
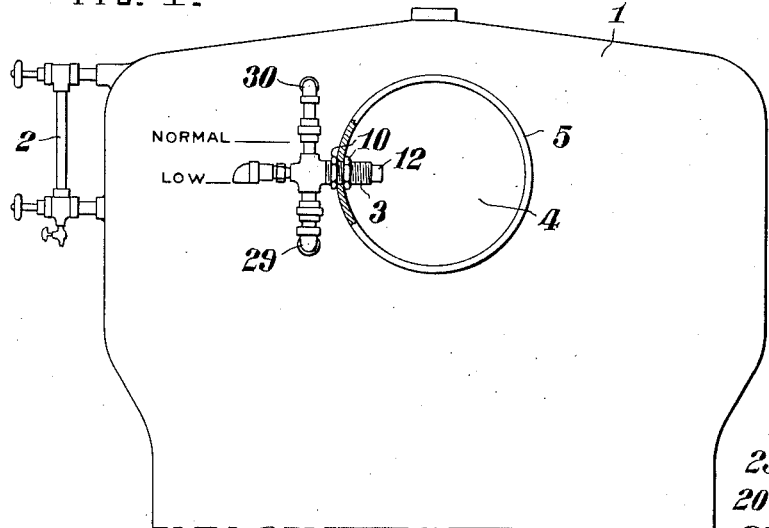
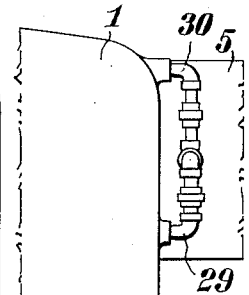
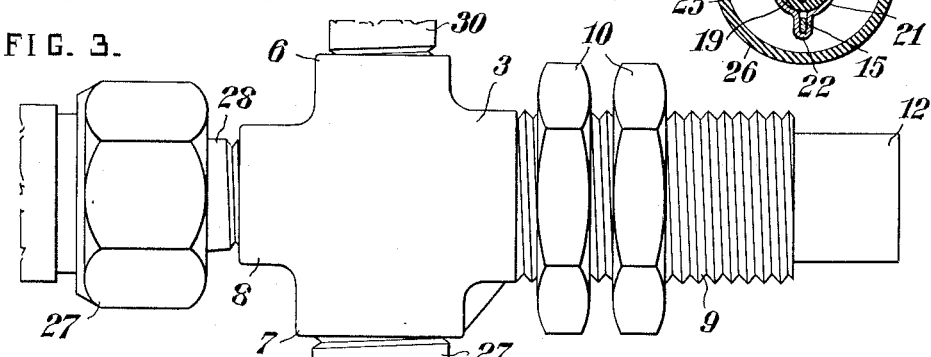
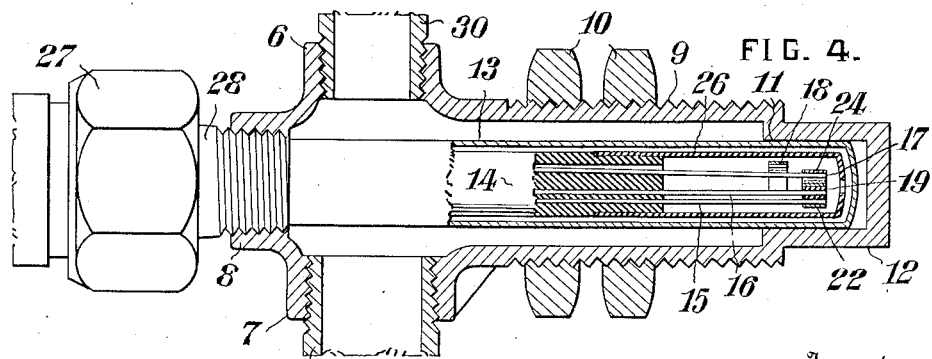
Inventor:
FREDERICK D. AUSTIN
By Edgar M Kitchin
his Attorney May 4, 1937. F. D. AUSTIN 2,078,990
SAFETY DEVICE FOR HEAT TRANSFERENCE APPARATUS
Filed Aug. 27, 1932 2 Sheets-Sheet 2
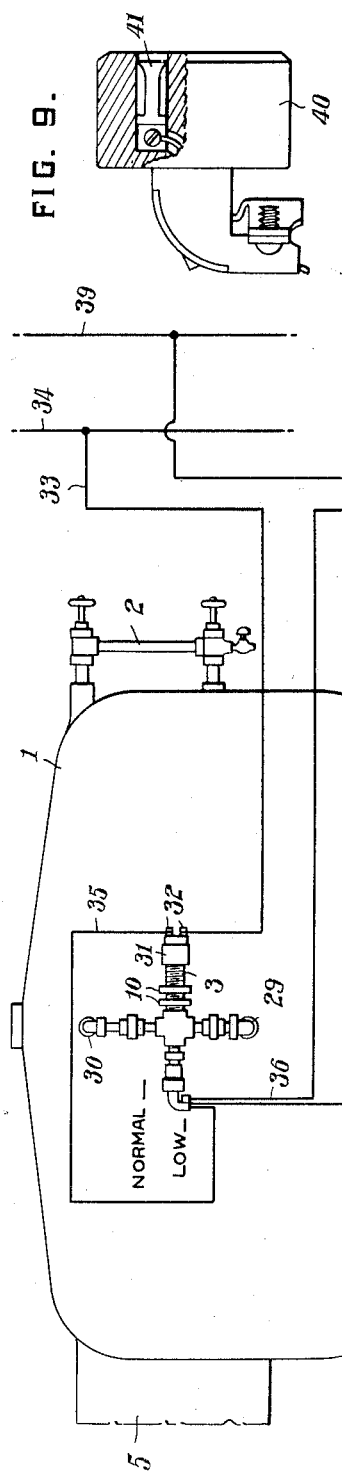
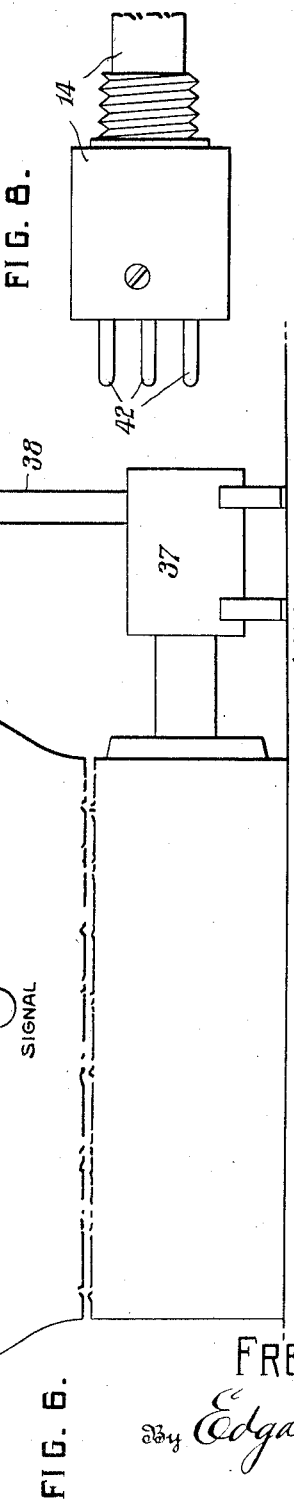
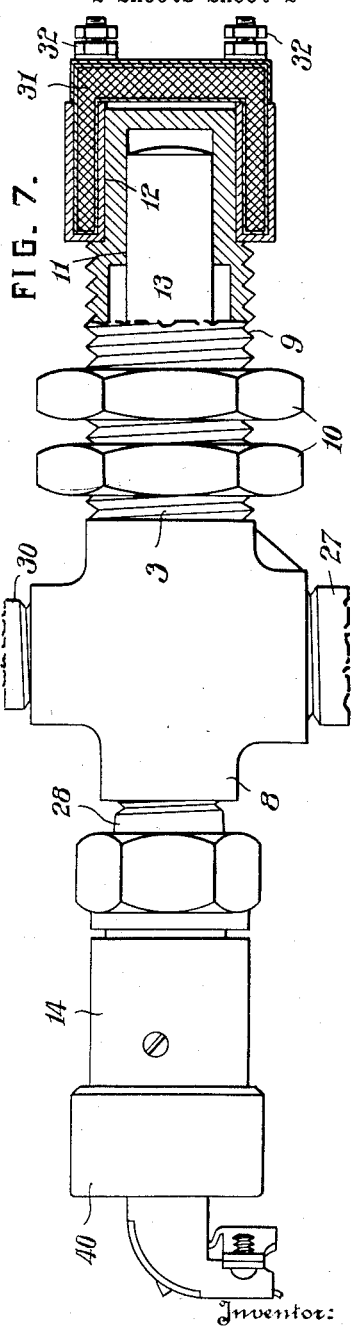
Inventor:
FREDERICK D. AUSTIN
By Edgar M Kitchin,
his attorney.

Patented May 4, 1937

2,078,990

UNITED STATES PATENT OFFICE 2,078,990

SAFETY DEVICE FOR HEAT TRANSFERENCE APPARATUS

Frederick D. Austin, Port Chester, N. Y.

Application August 27, 1932, Serial No. 630,743

14 Claims. (Cl. 122—504.3)

This invention relates to improvements in safety attachments for heat transference apparatus, and more particularly to such devices responsive to abnormal heat fluctuations.

An object is the guarding of the governing factor or factors for heat transfer such that excessive temperature variation will occasion a controlling operation of parts assuring safety and freedom from disastrous conditions such as might arise if the temperature variation were permitted to become excessive.

A further object is the carrying out of the first-mentioned object by means influenced to action by relayed or remote-control conditions.

In greater detail, a further object in view is the control of the status of the boiler or other heat-transference apparatus relative to the liquid level or other safety factor to provide for cutting off the fuel supply or otherwise taking such action as to prevent the danger incident to an undue drop of the water level below the line customarily considered safe, or other undue variation of an essential factor employed in the operation of the heat-transference apparatus.

A more detailed object is the rendition of the controlling device highly sensitive and responsive to the state of the boiler so as to assuredly function as and when required to protect the boiler and contiguous parts against danger and untoward results of a too low liquid level.

With these and further objects in view as will in part hereinafter become apparent and in part be stated, the invention includes the combining of control means of a heat-transference apparatus with means for governing said control means incident to undue variation in the transferred heat, the said governing means being responsive whether directly influenced by the heat variation of the transference apparatus or remotely influenced thereby.

The invention further comprehends, in connection with such a combination, the provision of a supplemental heat-transference unit governed by the main heat-transference apparatus for insuring highly responsive action of the control means.

The invention also includes an adapter designed to receive a heat-responsive control unit, which adapter is constructed to communicate with the water of the boiler and at the same time to extend into a position for being directly exposed to the interior heat travel of the boiler so that only by the presence of moisture in the adapter is the heat-responsive unit guarded against performing its control function as it does under conditions of danger.

In greater detail, the invention includes as an adapter a tubular body having inlet and outlet openings for water passage and an opening for the introduction of a heat-responsive control unit, the tubular body extending beyond said openings sufficiently to be adapted to extend into the heat travel area of a boiler.

The invention comprises certain other novel constructions, combinations, and arrangements of parts as subsequently specified and claimed.

In the accompanying drawings,—

Figure 1 is a fragmentary end view of a boiler equipped with an embodiment of the present invention.

Figure 2 is a fragmentary side elevation thereof.

Figure 3 is a view in side elevation of an embodiment of the present improved adapter detached, pipe connections being shown fragmentarily in engagement therewith, and the heat-responsive unit being seen in elevation.

Figure 4 is a longitudinal, vertical, central section through the adapter with parts of the heat-responsive unit shown in elevation and parts shown broken away.

Figure 5 is an enlarged cross section through the heat-responsive unit.

Figure 6 is a view similar to Figure 1 illustrating an embodiment of the remote control.

Figure 7 is a view similar to Figure 4 with the remote control attachment applied.

Figure 8 is a view in elevation showing the projecting terminals of the control unit.

Figure 9 is a similar view of the cap for the parts seen in Figure 8 with parts broken away to disclose one of the three internal sockets.

The danger and damage resulting from too low a water level in boilers whether of the domestic heating type or any other type is well understood, and it has been heretofore proposed to provide safeguards against such conditions by such means as water gauges, float-actuated valves, and switches, and even heat-controlled circuit breakers, but none of these has proved adequately sensitive.

It is, therefore, a primary object of the present invention to provide a liquid level cut-out which is sensitive both to the conditions in the water area of a boiler and also to the conditions in the line of heat travel which assures a highly dependable automatic action responsive within a minimum variation to insure protection against untoward conditions incident to over-heating in the fire areas or under-supply of the liquid level.

In the carrying out of this object, the invention includes means for subjecting a heat responsive unit directly to the conditions in the fire area or heat travel of a boiler while protecting such unit against action responsive to the heat by requisite preservation of the heat responsive unit below the temperature of response, and, to that end, the heat-responsive unit while being exposed to the temperature in the heat travel area of the furnace is located to be also exposed to the cooling action of the water in the boiler so long as the water is at or above the required liquid level. By such a location of the heat responsive unit, the dropping of the liquid level to the danger point exposes the heat-responsive unit directly to the action in the fire area of the boiler, which quickly raises the temperature of the unprotected heat-responsive unit and causes safety functioning thereof with a degree of sensitiveness never heretofore achieved.

Referring to the drawings by numerals, 1 indicates any ordinary or well known form of boiler, and, while the boiler shown in the drawings is that of a household heating unit, it will readily be understood that a horizontal boiler or any other well known type or form of boiler may be equipped with the present invention with readiness and assured effectiveness of protection. The various parts of the boiler 1 may, therefore, be considered as any of the well known and conventional parts, such as the liquid level gauge 2 which communicates with the boiler above and below the normal water line, as is the universal practice.

Whatever the nature of the boiler and its equipments, an adapter is provided which consists of a tubular projection 3 arranged to extend into any appropriate part 4 of the fire area or heat travel of the boiler, the projection 3 being located at substantially the plane of the lowermost safe liquid level of the water within the boiler. The projection 3 may take any of numerous forms so long as it is proportioned and adapted to and actually does extend into some part of the fire area of the boiler. It should be understood that the term "fire area" is employed to include any part of the line of travel of burnt products of combustion, and, therefore, to include either a part of the flue 5 for the boiler or any other portion of the path of travel of burnt products.

The tube 3 is proportioned to receive a heat-responsive unit, which unit will thereby be directly exposed within the tube to the action of the heat products of the fire area, and, in order to prevent heat-responsive action of the unit at undesirable times, the unit is maintained cooled by water within the boiler allowed to communicate within the tube 3, and preferably circulate therethrough. The method of hooking up the tube 3 to the boiler, of course, is susceptible of almost an endless number of details in the manner and arrangement of connection. One very desirable set of connections consists in providing the adapter tube 3 in the form of a pipe fitting, as seen in detail in Figures 3 and 4, which pipe fitting is preferably made up of an elongated body closed at its inner end and provided at its outer end with a pipe-connection T providing communicating ports or pipe receiving nipples 6, 7, and 8, each of which is preferably internally threaded with threads of the pipe thread type, to receive the threaded ends of pipe sections. The elongated body of the adapter or tube 3 is preferably threaded, as at 9, for a substantial length of the body and on which is preferably mounted the clamping nuts 10, 10, adapting the tube 3 to be clamped in position, as by having one of the nuts 10 at the outside and one at the inside of the furnace wall or flue sheet with the nuts threaded up snug against the respective faces of said wall or sheet. The innermost end portion of the body of tube 3 is preferably left smooth and provided internally with a circumferential offset 11 leaving a reduced bore at the inner terminus of the main bore of the tube 3. The reduced bore is proportioned to snugly receive the shell 13 of a heat-responsive unit hereinafter described, so that the heat-responsive unit will receive heat directly from the fire area of the boiler as transmitted through the wall of the inner end portion of tube 3 and the shell 13. To enhance such heat travel, the tube 3 is preferably made of an appropriate alloy of high heat conductivity, such as an alloy possessing a substantial proportion of copper. While, of course, the tube 3 may be of any appropriate material, such as iron or steel, the higher the heat conductivity of material used, the more sensitive the responsiveness of the unit.

The shell 13 and its contained heat-responsive unit may involve, so far as the present invention is concerned, any of numerous embodiments of various forms of heat fusing or other heat-responsive control means, but I preferably employ such a unit as is set forth in detail in my co-pending patent application Serial No. 630,472 filed even date with this application, and in which the shell 13 surrounds a withdrawable or removably mounted insulator bar 14 containing the conductors through which the control current passes. The arrangement and details of these conductors and of the controlling devices therefore are susceptible of an almost limitless variation, but one form includes the provision of three conductors 15, 16, and 17. Conductor 17 is spring-tensioned to normally stress away from conductors 15 and 16. Conductor 16 carries a conductor ring 18 in electrical communication with itself and surrounding but normally out of contact with the conductor 17. Conductor 16 extends into an insulating block 19 which carries a conductor plate 20 connected by a band 21 extending about the insulator 19 with a loop 22 into which the conductor 15 detachably extends and with which it electrically contacts. The plate 20 is fixed to a conductor plate 23 by fusible material, preferably in the form of heat fusible solder. The solder, however, is an alloy, as set forth in my above-mentioned, co-pending application, which, while being highly responsive to heat fusing, is not appreciably responsive to electrical overload or underload. Plate 23 is provided with a loop or sleeve 24 into which the conductor 17 extends. It should be understood that conductor 16 extends into an opening 25 in the insulating block 19 proportioned to appropriately receive the same and to insulate the conductor from the other parts of the block and the other conductors. Thus, two circuits are provided with a common return, so that, for instance, the power current may flow normally from conductor 15 to conductor 17, but when the solder between plates 20 and 23 fuses and conductor 17 springs away from the other two conductors, the power circuit will be broken. The movement of the conductor 17 brings it into contact with the ring 18 which closes a circuit between conductors 15 and 16 which may be an appropriate signal circuit, or a circuit for turning on a water supply or otherwise. Preferably an appropriate, detachable insulating cap 26 encloses the otherwise exposed parts of the fusing member and conductors which make up the heat-responsive unit. The cap 26 has its open end snugly engaging the inner end of the insulating bar 14. The shell 13 is preferably of relatively thin metal, and preferably of an alloy of high heat conductivity, such as brass or other alloy of copper. The outer end portion of the shell 13 terminates in an appropriate nut or other handle 27 with threads 28 inward of the nut pitched and proportioned to cooperate with the threads of the nipple 8 so that the heat-responsive unit may be readily inserted into the adapter tube (tube 3) and as readily withdrawn. Threads 28 enable the easy and quick water-tight connection so that water circulating within the adapter tube will not leak out past the outer end of the heat-responsive unit.

The shell 13, as is plain from Figure 4, is of a diameter sufficiently less than the diameter of the main bore of adapter tube 3 as to leave ample space for liquid circulation about the shell, so that the shell may be maintained at the required low temperature against heat-responsive fusing under normal conditions. However, in order to render the unit highly responsive in the absence of a cooling agent within the adapter tube, the reduced bore 11 is proportioned to just snugly receive the inner end portion of the shell 13, so that contact is maintained between the inner end portion of the shell and the inner end portion of the adapter tube 3. Heat travel, therefore, is greatly facilitated by the conductivity of the material of tube 3 and of shell 13.

As will be well understood by engineers and others skilled in the art, the hook-up to the water area of the boiler may involve any appropriate or convenient arrangement of connections, such as a lower tube 29 leading from a point substantially below the normal liquid level of the boiler and connected into the nipple 7 and the upper tube 30 leading from the nipple 6 to and communicating with the boiler at a point substantially above the normal liquid level thereof. It is important that the tubes 29 and 30 be so arranged as to communicate with the respective nipples 7 and 6 while the adapter tube 3 is properly located horizontally substantially at the lowest safe liquid level for the water in the boiler. Naturally, unions and other well known fittings will be employed as desirable for making the hook-up.

The operation is believed obvious from the foregoing and may be briefly stated to consist of preserving the heat-responsive fusing unit within the adapter tube against fusing by the cooling action of the liquid in the boiler circulating about the shell 13 so long as the liquid level in the boiler is high enough to be safe. As soon as that level drops to a point where it is liable to become dangerously low, the liquid will no longer be high enough to enter the adapter tube 3, and, therefore, the shell 13 will not be cooled sufficiently to prevent the fusing action. The responsiveness of the fusing unit or heat-responsive unit is both quick and dependably uniform or precise. With one form of unit employed by me the drop of the liquid level below the level of the adapter tube 3 will be followed in less than one and one-half minutes by the fusing action which effects the desired controlling change in circuit conditions. Of course, this statement is not to be taken as restrictive, but illustrative only, since a shorter time can be made possible by modification of the fuse and a longer time similarly made possible by other variations.

While I have referred to the part 1 as an ordinary domestic boiler, this, of course, is but a specific application, and the part is, in fact, a heat-transference apparatus with all that that signifies including transfer heat whether for increasing or decreasing the temperature at any particular place or point. It is now well known that domestic boilers and like heat-transference apparatus are equipped for "air-conditioning", that is reducing the temperature of a building during the heated season as well as increasing the temperature during the cold season, and it should be understood that the present invention is well adapted for any heat-transference apparatus where excessive variation in temperature beyond that previously determined is liable to occasion danger or damage.

Furthermore, while the adapter is shown specifically in Figure 1 as located in the fire area, that is the travel of the burnt products of combustion, that location is selected for purposes of insuring a higher temperature of the exposed free end of the adapter than required for releasing the fuse of plate 23, so that if the liquid level drops in the adapter so as to expose the fuse of the control unit that fuse will be sure to function to release the bar 17 to contact with ring 18 and thereby effect the governing action intended. It follows, therefore, that the heating of the free end of the control unit does not need to depend upon the heat-transference apparatus at all, and the heating action may be accomplished in any other appropriate or desirable manner, as by subjecting the free end of the adapter to an independent heat source or heat-transference apparatus or other heater. An acceptable form of such heater is shown in detail and in combination in Figures 6 and 7, in which the same reference numerals have been applied and the same description will apply, except that a heater unit 31 is located to raise the temperature of the otherwise inner or free end of the adapter 3. As a matter of preference and convenience, the heater unit 31 snugly fits the reduced portion 12 at the free end of the adapter, and, to that end, the heater unit is preferably shaped as a socket or cup of annular form having a closed end rearward of the end of the adapter. The heater unit is preferably electrical, and, to that end, is provided with binding posts 32 and 33 connected to the respective ends of the heating element within the unit 31. Obviously, the heating element may be of any of the well known commercial constructions. When the heater unit 31 is employed, the adapter is preferably located for what I designate "remote control", that is to say, spaced from the heat-transference apparatus or boiler 1, but at the required relative liquid level and connected by the communicating pipes 29 and 30, as seen in Figure 6. The adapter may be spaced from the heat-transference apparatus at practically any distance so long as the liquid level in the adapter is maintained relative to the liquid level of the heat-transference apparatus 1. In employing this combination, I preferably utilize a circuit which includes the heating unit 31 as part of the circuit for the motor governing or supplying the fuel or other actuating agency for the heat-transference apparatus 1. To this end, as seen in Figure 6, a line 33 extends from street service or other main line source 34 to one of the binding posts 32, and a line 35 extends from the other binding post 32 to rod 15, and a line 36 extends from rod 17 to the fuel or other service motor 37, the other side of said motor being connected by a line 38 to the opposite main line 39. Of course, any of the customary or desired hand-operated or otherwise controlled switches, thermostats or other devices will be inserted in this circuit wherever and as desired according to the independent control required. Such additional control devices are not illustrated.

It should be apparent from the foregoing that the operation will consist under normal conditions of the normal functioning of the motor 37 unless and until some abnormal situation arises which causes the liquid level in the adapter 3 to drop sufficiently to expose the control unit to the heat of the heater unit 31. When this abnormal condition arises, the resulting heating of the fuse and its fusing occasions the breaking of the circuit between rods 15 and 17, and closing of the circuit between rods 16 and 17 through ring 18, and the consequent governing of the motor 37 as required whether to shut off its current in case it is feeding fuel to the heat-transference apparatus or turn on its current in case it is intended to actuate and close a valve for cutting off a gas supply or to cause the motor to perform whatever other function is intended to insure cessation of the heat-transference action until the abnormal condition can be and is corrected, and a new fuse unit is inserted in the heat-responsive unit 13.

It should be observed, of course, that some other form of heater unit, such as a fuel burner, may be employed in lieu of the electrical heater unit 31 with substantially the same advantageous results, except that where the electrical heater unit is utilized the unit itself serves as a further safeguard. If the heater unit 31 be electrical and for some reason breaks down so that the requisite heat is not provided to be supplied to the heat-responsive unit, the very failure of the heater unit 31 to function will insure an interruption in the motor circuit affording the same or equal safety action as if the heat-responsive unit had fused.

The details of the detachable hook-up for the circuit wires with the rods 15, 16, and 17 are susceptible of a wide range of variation, but I find it desirable to have the parts so constructed as to avoid accidental short-circuiting when the contacts are detached for the withdrawal of the heat-responsive unit for renewing a fuse. It is obvious, of course, that if any "live" prongs are allowed to extend, that is to say if the current wires which lead to the insulating block 14 and to the rods 15, 16, and 17 are disconnected, as by the pulling of the cap 40 away from the insulating block 14, and prongs representing those wires outstand from the cap 40 possibility of short-circuiting would be thereby occasioned, since if such extending prongs happened to strike a metal part, such as the side of a furnace, the main fuse of the supply circuit would probably be blown. To avoid any such possibility, instead of providing outstanding prongs from the cap 40, the cap is provided with sockets 41, to receive prongs 42, extending respectively from the rods 15, 16, and 17, and the sockets 41 are provided with the usual metal receivers for the prongs 42 which receivers are respectively connected to the wires of the circuit. Thus, when the cap 40 is removed the prongs 42 which are exposed are entirely "dead" and harmless.

What is claimed is.—

1. In low water level cut-outs, the combination of a tube adapted to have a closed portion extended into the area of heat travel of a boiler and to be located approximately at the low liquid level of the boiler, means of communication of the tube with the boiler above and below the low water level, circuit-controlling heat-responsive means arranged within the tube and a casing enclosing the heat-responsive means within the tube and protecting the same from water contact.

2. The combination of a tube having a closed end adapted to extend into the heat travel area of a heat-transference apparatus and having means for detachably receiving a heat-responsive unit within the tube, a heat-responsive unit, and an enclosing shell therefor extending into the tube and having contact with the tube at the inner portion thereof.

3. The combination as claimed in claim 1 wherein the casing for the heat-responsive means is proportioned relative to the tube to provide a water space between the tube and casing with which space the boiler communicating means connects.

4. In safety devices for boilers, the combination of a tubular adapter designed to be located substantially at the liquid level of a boiler and having means of circulatory communication with the liquid of the boiler, a heat-responsive element extending into the adapter in position to be cooled by liquid of the boiler, and the adapter comprising a substantially horizontal tube having one closed end and one open end and the means of communication extending from the lower and upper portions of the tube to the boiler respectively below and above the liquid level thereof, and the heat responsive element closing the open end of the tube and means independent of the heat of the liquid of the boiler for heating the adapter tube sufficiently for effecting heat-responsive action of the heat-responsive element in the absence of liquid of the boiler from within the tube.

5. An adapter for thermically responsive control elements for heat-transference apparatus comprising an elongated tubular body arranged to be externally heated, the tubular body being closed at one end and open at the other and adapted to receive a control element through the open end, and being of a sufficiently greater internal cross-sectional area relative to the cross-sectional area of the control element to be received as to provide a water jacket about said control element, and the body of the adapter having adjacent its open end a flow opening for receiving liquid to be circulated about such jacket.

6. The combination of a tube adapted to extend into a source of heat, means cooperable with said tube for detachably receiving a heat-responsive unit within the tube, a heat-responsive unit in said tube, and an enclosing shell for the heat-responsive unit extending into the tube and spaced from the tube for a substantial portion of the length of the shell, said shell having substantial surface contact with the tube at a portion thereof to be subjected to the source of heat.

7. An adapter for thermically responsive control elements for heat-transference apparatus comprising an elongated tubular body closed at one end and arranged to have its closed end portion extended into the heat travel area of said apparatus, the tubular body being also constructed to receive a control element and to be spaced about the element to provide an area for a cooling medium, and said tubular body having a transverse opening in a wall thereof for admission to said area of a cooling medium.

8. The combination of a tube adapted to extend into a source of heat, means cooperable with said tube for detachably receiving a heat-responsive unit within the tube, a heat-responsive unit in said tube, and an enclosing shell for the heat-responsive unit extending into the tube and spaced from the tube for a substantial portion of the length of the shell, said shell having substantial surface contact with the tube at the inner end portion thereof to be subjected to the source of heat.

9. A low water safety device comprising relatively movable elements, means for effecting a relative movement thereof, means including fusible material for holding said elements against relative movement, heat controlling means operable by the relative movement of said elements, and a heating coil for supplying a uniform amount of heat to said fusible material sufficient to raise it above the fusing temperature thereof when not immersed in liquid, and means for supporting said device in connection with a liquid heating receptable, in position to subject said fusible material to the heat transmitting action of the liquid at a predetermined level.

10. A low water safety device including among its members a fusible part, means separated therefrom by heat insulating material for supporting said part in position to be subjected to the heat transmitting action of a liquid when the level thereof is above a predetermined low level, elements normally held from relative movement by said fusible part, means for effecting relative movement of said elements, means for operatively connecting said device with a heating means for the liquid operative on the melting of said fusible part to effect a reduction of the heat supplied to the liquid, and an electric heating coil capable of supplying a uniform degree of heat to said fusible part sufficient to raise it above the fusing temperature when not subjected to the heat transmitting influence of the liquid, and means for connecting said coil with a source of electrical energy.

11. A low water safety device including among its members a fusible part, means separated therefrom by heat insulating material for supporting said part in position to be subjected to the heat transmitting action of a liquid when the level thereof is above a predetermined low level, elements normally connected by said fusible part, means for operatively connecting said device with a heating means for the liquid operative on the melting of said fusible part to effect a reduction of the heat supplied to the liquid, an electric heating coil capable of supplying a uniform degree of heat to said fusible part sufficient to raise it above the fusing temperature when not subjected to the heat transmitting influence of the liquid, a circuit through said coil for energizing the same, and means for electrically insulating said coil and circuit from said supporting means and from the liquid.

12. A low water safety device including among its members a fusible part, means separated therefrom by heat insulating material for supporting said part in position to be subjected to the heat transmitting action of a liquid when the level thereof is above a predetermined low level, elements normally connected by said fusible part, means for operatively connecting said device with a heating means for the liquid operative on the melting of said fusible part to effect a reduction of the heat supplied to the liquid, an electric heating coil capable of supplying a uniform degree of heat to said fusible part sufficient to raise it above the fusing temperature when not subjected to the heat transmitting influence of the liquid, a circuit through said coil for energizing the same, said fusible material being enclosed to prevent direct contact with the liquid, and means for electrically insulating said heating coil and its circuit from said supporting means, and from said elements connected by the fusible part.

13. In a liquid heating apparatus, a liquid receiving casing having an aperture substantially in the plane of the low safe liquid level in the apparatus, a supporting member closing said aperture against egress of liquid from said casing, an elongated tubular housing member carried by said supporting member, said housing member being sealed at one end to said supporting member and having its other end closed, a circuit controlling member extending into said housing member and tensioned for movement, fusible material in said housing member cooled by liquid in said casing and acting to hold said controlling member in fixed position, and heating means for said fusible material operable upon decreased cooling of said material by said liquid to melt said material and thereby release said controlling member.

14. In a liquid heating apparatus having an electrically controlled heating means, a liquid receiving casing having an aperture substantially in the plane of the low safe liquid level in the apparatus, a hollow supporting member removably secured to said casing and closing said aperature against egress of liquid from said casing, an elongated tubular housing member carried by said supporting member, said housing member being sealed at one end to said supporting member and having its other end closed, a member tensioned for movement and extending into said housing member and controlling the circuit of said heating means, fusible material in said housing member cooled by liquid in said casing and acting to hold said tensioned member against movement, a tubular electric heating coil surrounding said tensioned member to heat said material and operable upon decreased cooling of said material by said liquid to melt said material and thereby release said tensioned member to stop said heating means.

FREDERICK D. AUSTIN.